(12) United States Patent
Dodd et al.

(10) Patent No.: US 6,862,653 B1
(45) Date of Patent: Mar. 1, 2005

(54) SYSTEM AND METHOD FOR CONTROLLING DATA FLOW DIRECTION IN A MEMORY SYSTEM

(75) Inventors: James M. Dodd, Shingle Springs, CA (US); Michael W. Williams, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 09/664,516

(22) Filed: Sep. 18, 2000

(51) Int. Cl.[7] .............................................. G06F 12/00
(52) U.S. Cl. .................. 711/105; 711/110; 711/113; 711/117; 711/154; 710/310; 365/230.08
(58) Field of Search ................................ 711/105, 110, 711/113, 117, 154; 710/310; 365/230.08

(56) References Cited

U.S. PATENT DOCUMENTS

| | | | | |
|---|---|---|---|---|
| 4,788,660 A | * | 11/1988 | Arizono | 712/40 |
| 6,029,253 A | * | 2/2000 | Houg | 713/600 |
| 6,055,597 A | * | 4/2000 | Houg | 710/307 |
| 6,073,190 A | * | 6/2000 | Rooney | 710/56 |
| 6,115,551 A | * | 9/2000 | Chao | 710/62 |
| 6,185,644 B1 | | 2/2001 | Farmwald et al. | 710/102 |
| 6,209,071 B1 | | 3/2001 | Barth et al. | 711/167 |
| 6,321,310 B1 | * | 11/2001 | McCarthy et al. | 711/154 |
| 6,381,659 B2 | * | 4/2002 | Proch et al. | 710/57 |
| 6,502,161 B1 | | 12/2002 | Perego et al. | 711/5 |
| 6,513,090 B1 | * | 1/2003 | Jeddeloh | 710/310 |
| 6,581,147 B1 | * | 6/2003 | Rovati | 711/167 |

OTHER PUBLICATIONS

CaoHuu et al., "Universal Read/Write Buffer For Multiprocessor Cache Coherency Schemes," pp 785–790, IEEE, 1993.*

* cited by examiner

Primary Examiner—Stephen Elmore
(74) Attorney, Agent, or Firm—Pillsbury Winthrop LLP

(57) ABSTRACT

A system and method for controlling the direction of data flow in a memory system is provided. The system comprising memory devices, a memory controller, a buffering structure, and a data flow director. The memory controller sends data, such as read-data, write-data, address information and command information, to the memory devices and receives data from the memory devices. The buffering structure interconnects the memory device and the memory controller. The buffering structure is adapted to operate in a bi-directional manner for the direction of data flow therethrough. The data flow director, which may reside in the buffering structure, the memory controller, the memory devices, or an external device, controls the direction of data flow through the buffering structure based on the data transmitted from the memory controller or the memory device.

25 Claims, 10 Drawing Sheets

US 6,862,653 B1

SYSTEM AND METHOD FOR CONTROLLING DATA FLOW DIRECTION IN A MEMORY SYSTEM

BACKGROUND OF THE INVENTION

1. Field of the Invention

The present invention generally relates to a memory system, and in particular, to a system and method for controlling the direction of data flow in a memory system having a buffering structure interconnecting a memory controller and memory devices. The memory devices may, for example, be dynamic random access memory (DRAM) devices.

2. Related Art

A typical memory system includes a memory controller and memory devices, such as DRAMs, coupled thereto. In some systems, a processor performs memory controller functions. As used herein, the term memory controller includes such a processor. FIG. 1 illustrates a prior art memory system having memory devices 80–95 residing on memory modules. The memory modules are connected to a memory controller 50 via connectors 60, 70. In such a system, it is required that each component operates with the same interface voltage and frequency. Therefore, the memory controller 50 is manufactured to operate with specific memory devices 80–95 meeting these parameters. Conversely, the memory devices 80–95 are also utilized only with a memory controller 50 having the same interface voltage and operating frequency. Therefore, the memory devices 80–95 utilized with memory controllers are limited to only those having the same interface voltage and operating frequency as that of the memory controller 50.

FIG. 2 shows the bi-directional nature of communication exchanges in a memory interface. The memory interface may be a data bus 52, which may represent, address bus lines, command signal lines, and/or data bus lines. The data bus 52 of the memory interface is bi-directional since a memory system has to be able to write data and read data on the same pins connecting the memory controller 50 and the memory devices 80–95. The memory controller 50 includes a bi-directional internal input/output buffer. The memory devices 80–95 also have bi-directional internal input/output buffers. When the memory controller 50 is doing a read or a write, it has complete knowledge of the read and write. That is, the memory controller 50 knows when to turn off its driver and listen to its input internal buffer. Similarly, the memory devices 80–95 also have complete knowledge of when to turn off their drivers and listen to their internal buffers based on the commands that they receive and the function(s) to be performed. Because both the memory controller 50 and the memory devices 80–95 are able to control the direction of their own internal buffers automatically, the direction of data flow between the memory controller 50 and the memory devices 80–95 can be readily controlled. However, the memory devices 80–95 are limited to only those having the same interface voltage and operating frequency as that of the memory controller 50. The cost requiring specifically designed memory devices 80–95 to match the memory controller 50, and vice versa, creates enormous development expenses, as well as limiting the interchangeability of various existing memory components.

In other memory systems, solutions have evolved to provide connection to memory devices on selective bases. For example, in a Double Data Rate-Synchronous DRAM (DDR), located on the module are field effect transistor (FET) switches which isolate the DRAM from the main memory bus. This isolates the capacitive load. The FET switches are turned on t o connect the DRAM to the memory bus only when the DRAM is being read or written. When the FET switches are to be turned on, the DRAM sends out a control signal. This method focuses on using a special kind of DRAM and does not deal with the flow direction of the data. The FETs as a whole are merely acting as a switch that connects the DRAM to the memory bus. Therefore, there is a need for a system and method to control the direction of data flow in a memory system that would not require each component to operate with the same interface voltage and frequency.

DETAILED DESCRIPTION

Figure 1:
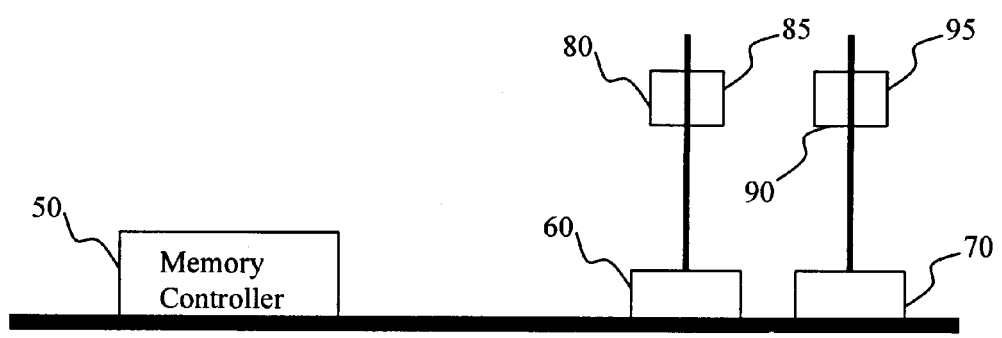
FIG. 1 illustrates a prior art memory system.
Figure 2:
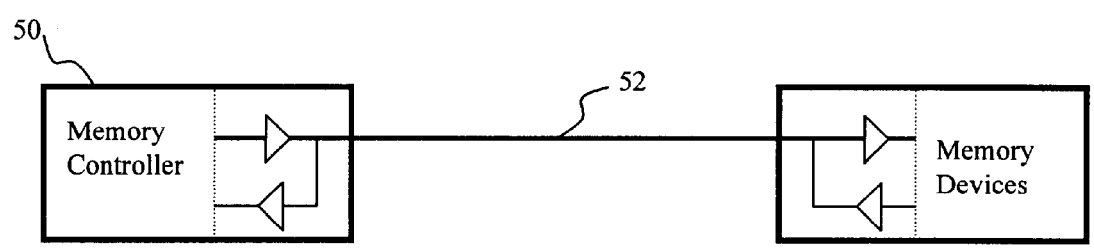
FIG. 2 shows the bi-directional nature of communication exchanges in a prior art memory interface.
Figure 3:
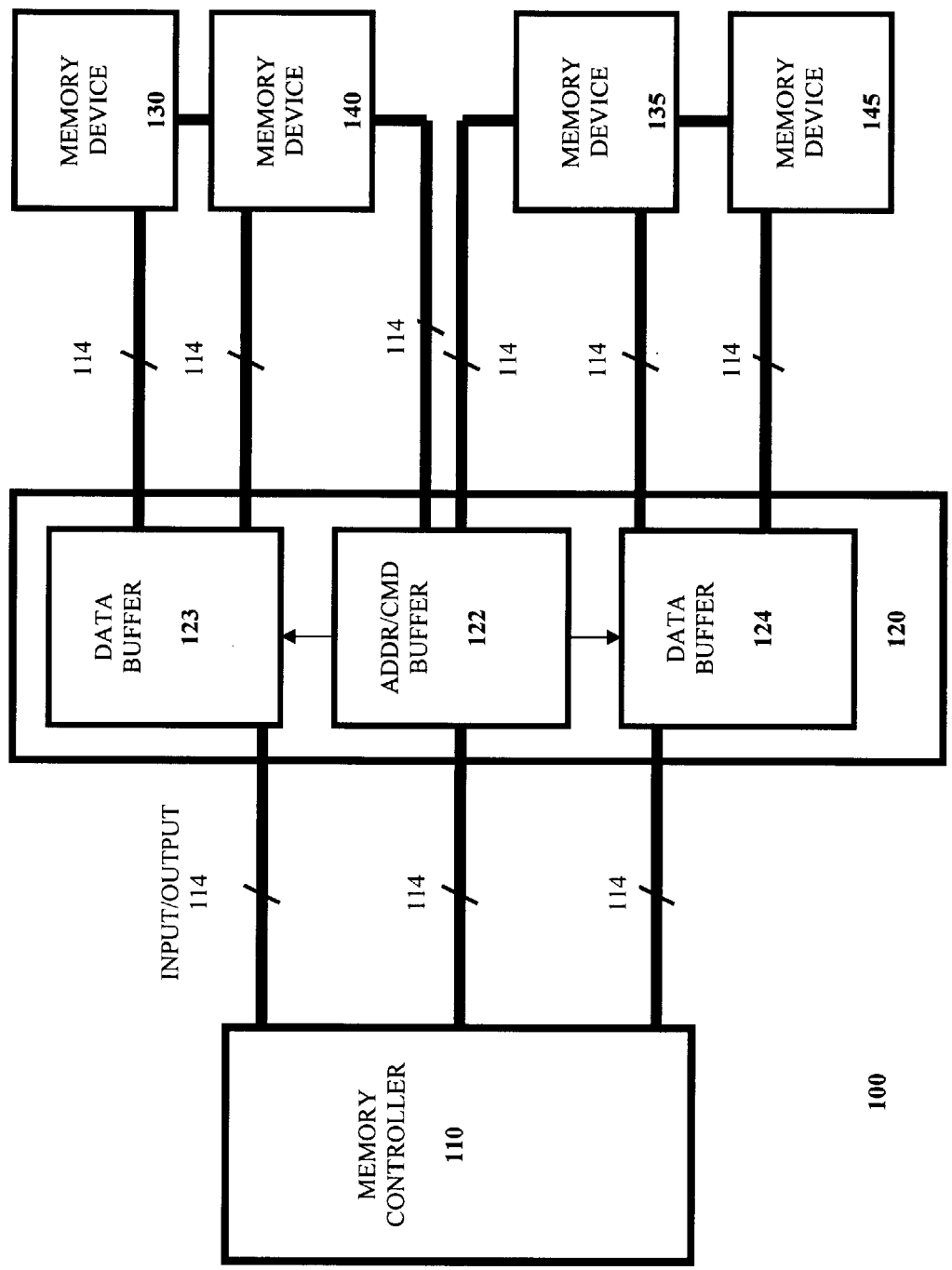
FIG. 3 illustrates a diagram of a memory system according to an embodiment of the present invention and in which embodiments of the present invention may function.

FIG. 3 illustrates a diagram of a memory system according to an embodiment of the present invention and in which embodiments of the present invention may function. The memory system 100 comprises a memory controller 110, a buffer 120, and memory devices 130–145. The buffer 120 is an external buffer(s) or register(s) that has the functionality of reducing the impedance seen by the memory controller 110. The memory controller 110 is coupled to the buffer 120, which is being further coupled to the memory devices 130–145, such as DRAM devices. Although the Input/Output connection lines 114 are represented as single lines to the buffer 120, and to the memory devices 130–145, each represented line 114 may in fact be a plurality of lines. The memory controller 110 may, for example, be a chipset central processing unit, and it is adapted to transmit different information—e.g., data, address information, command information—to the memory devices 130–145 via the buffer 120. The memory controller 110 is further adapted to receive data from the memory devices 130–145 via the buffer 120. The buffer 120, may be comprised of a single component, or a number of specialized buffers or registers. The specialized buffers or registers may, for example, be data buffers 123, 124 for buffering data, and address and command buffer 122 (ADDR/CMD Buffer) for buffering address information and command information transmitted from the memory controller 110 and/or status information transmitted from the memory devices 130–145. By placing the buffer 120 in between the memory controller 110 and memory devices 130–145, transfer of data and information between the memory controller 110 and memory devices 130–145 is facilitated. The electrical characteristics of the memory system 100 are also improved and bolder scaling is allowed.

Figure 4:
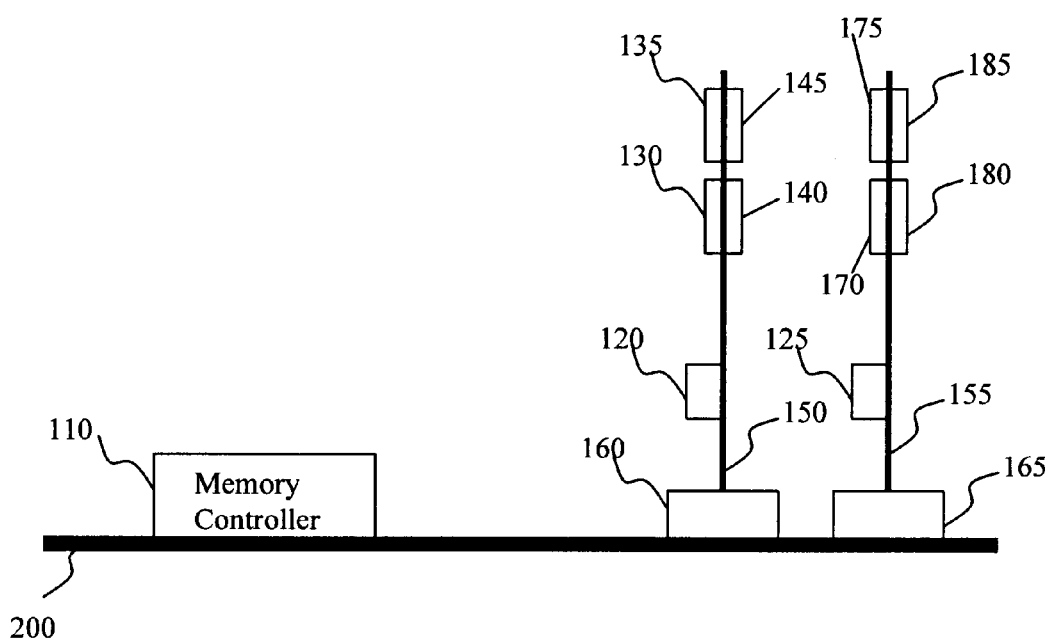
FIG. 4 shows an illustrative example of a memory system according to an embodiment of the present invention.

FIG. 4 shows an illustrative example of a memory system according to an embodiment of the invention. In this example, the memory controller 110 resides on a motherboard 200. The memory devices 130–145, 170–185 resides on memory modules 150, 155. The memory modules 150, 155 are connected to the motherboard 200 through connectors 160, 165. The memory devices 130–145 reside on the first memory module 150, while the memory devices 170–185 reside on the second memory module 155. In other embodiments, the configuration of the memory devices 130–145, 170–185 on the memory modules 150, 155 may be different, and the memory controller 110 may control more or fewer memory devices than those shown in FIG. 4.

In this embodiment, the buffers 120 and 125 reside on the memory modules 150 and 155, respectively, creating buffered modules in which the direction of data flow between the controller 110 and the memory devices 130–145, 170–185 is controlled. However, the buffers 120, 125, and the individual elements of the buffers 120, 125 such as data buffers 123, 124 and ADDR/CMD buffer 122, are not limited to the placement shown in FIG. 4. That is, they are not limited to placement on a memory module. The buffering of data and command/address can also be performed on the motherboard device 200 or on external (discrete) buffers. In one embodiment, external (discrete) buffers are utilized to allow different voltages and frequencies to be used for the memory controller 110 and memory devices 130–145, 170–185.

In carrying out instructions from a central processing unit (CPU) of a computer, information and data are constantly sent from the memory controller 110 to the memory devices, and vice versa. In one instance, the memory controller 110 may wish to write data to the memory devices, wherein the memory controller 110 sends address and command information for a write and the data to be written to the buffer 120. The buffer 120 receives the information and the data from the memory controller 110 and sends them to specific locations within the memory devices. In another instance, the memory controller 110 may wish to read data from the memory devices, wherein the memory controller 110 sends address and command information for a read to the buffer 120 and receives read-data from the memory device via the buffer 120. The buffer 120 receives the read-data from specific locations within the memory devices and sends the read-data to the memory controller 110. Thus, data must be able to flow through the buffer 120 in a bi-directional manner, from the memory controller 110 to the buffer 120 to the memory devices, and from the memory devices to the buffer 120 to the memory controller 110. In a first mode, the buffer 120 receives data from the memory controller 110 and sends data to the memory devices. In a second mode, the buffer 120 receives data from the memory devices and sends data to the memory controller 110.

Various methods may be utilized to control the direction of data flow between the memory controller 110 and the memory devices 130–145, switching the direction of data flow from the first mode to the second mode or from the second mode to the first mode. A first method involves the buffer 120 determining the direction of data flow. A second method involves an external device indicating the direction of data flow through the buffer 120. A third method involves the memory controller 110 setting the direction of data flow through the buffer 120. A fourth method involves the memory devices 130–145, 170–185 setting the direction of data flow through the buffer 120.

Figure 5A:
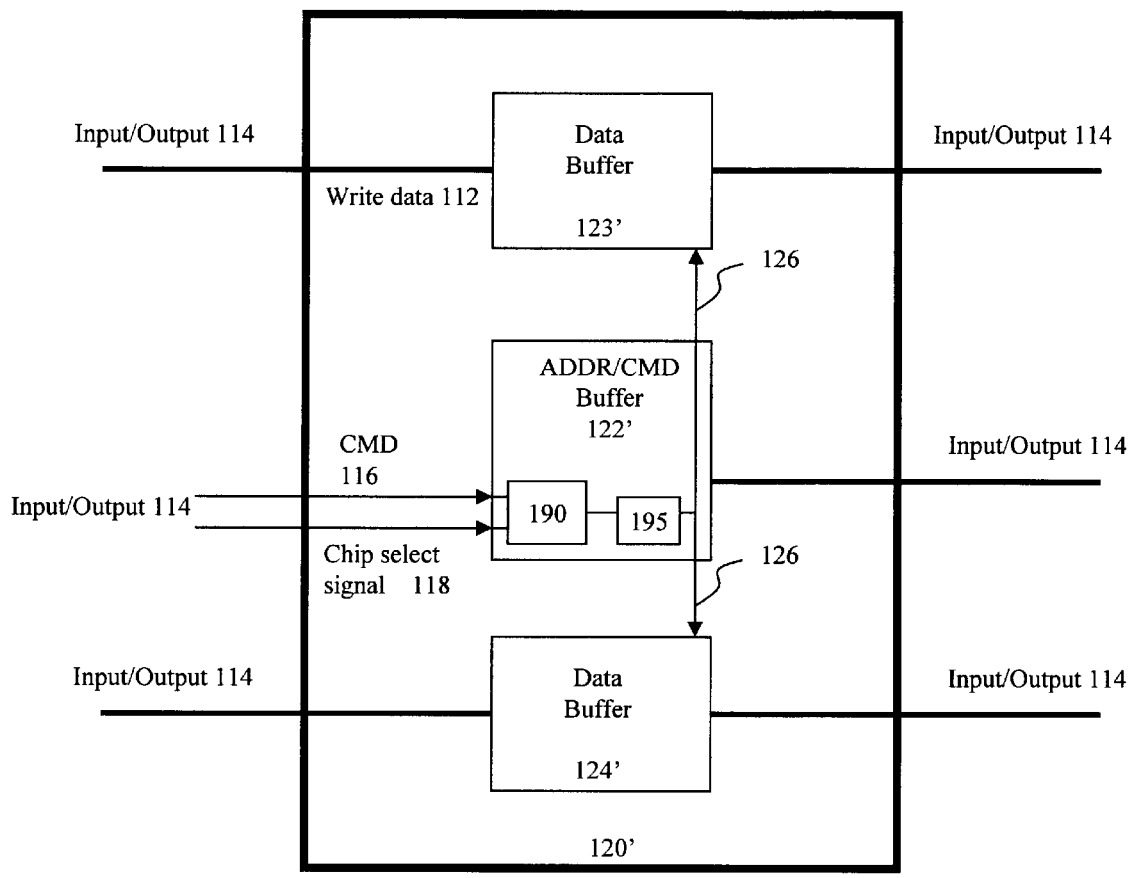
FIG. 5a depicts a buffering structure according to an embodiment of the present invention.

FIG. 5a depicts a buffering structure according to a preferred embodiment of the present invention. The buffering structure 120' includes buffers 120, 125 as shown in FIG. 4. In this embodiment, the buffering structure 120' determines the direction of data flow utilizing a decoder 190 and logic 195, which reside in the buffering structure 120'. The buffering structure 120' also includes data buffers 123', 124' and an ADDR/CMD buffer 122', wherein the decoder 190 and the logic 195 are embedded in the ADDR/CMD buffer 122'. Data such as data to be written to a memory device (written-data 112), address information, and/or command information 116 are sent from a memory controller (not shown). The written-data passes through the data buffers 123', 124'. The number of the data buffers contained in the buffering structure 120''s is dependent upon a specific application of the present invention; there could be only one data buffer or there could be multiple data buffers. The command information 116 and address information pass through the ADDR/CMD buffer 122' along with a chip select signal 118 that selects a particular memory device (not shown) to which the command and address information is directed. When the ADDR/CMD buffer 122' receives command information 116 and the chip select signal 118 from the memory controller, it determines whether the command information 116 is directed to memory devices served by the buffering structure 120' or directed to memory devices served by another buffering structure in the memory system. Such determination may, for example, be made by analyzing the chip select signal 118 to see if the select signal 118 purports to select a memory device or a memory module that is served by the buffering structure 120'. If the chip select signal 118 selects a memory device or a memory module served by the buffering structure 120', the chip select signal 118 is reset and the embedded decoder 190 in the ADDR/CMD buffer 122' decodes the command information 116, which may, for example, be a read command or a write command.

According to a preferred embodiment of the present invention, the buffering structure 120' may, for example, be defaulted to drive toward the memory devices, i.e., from left to right in FIG. 5a. Thus, when a request to write data to the memory devices is received at the buffering structure 120', there is no need to switch the direction of data flow through the buffering structure 120'. However, when there is a request to read data from the memory devices, the direction of data flow through the buffering structure 120' needs to be switched. This way, data to be read, or read-data, can flow from the memory devices to the memory controller, i.e., from right to left in FIG. 5a.

In the embodiment, the buffering structure 120' is defaulted to drive towards the memory devices. When the ADDR/CMD buffer 122' receives a read command and decodes it to determine that it is a read command, the embedded logic 195 in the ADDR/CMD buffer 122' sets a delay period and then drives the direction of data flow through the buffering structure 120', or just the data buffers 123', 124', in the opposite direction. The delay period may be needed before the read-data can be driven back from the memory devices at a pre-ordained time that has been stipulated by the memory system. The delay period affords time for signals, such as a chip select signal, address information, and command information, to propagate from the buffering structure 120' to the memory devices. The memory devices also need time to retrieve the read-data once the memory devices receive and decode the address information and the command information 116. When the memory devices see the read command from the buffering structure 120', the memory devices find the read-data and then drive the read-data back in the direction of the buffering structure 120'. At that point, the delay period comes to an end.

The delay period symbolizes the amount of time until the data is ready to be driven back from the memory devices, which in a memory system with DRAM devices is often referred to as the read latency or as CAS (column address strobe) latency. The delay period may be implemented in various ways, and is implemented by taking into consideration the capability of the memory devices responsible for the delay. The delay may be programmed as the number of clocks required between a read request and the availability of the read data. The delay value may be hardwired in the embedded logic 195. In one implementation, the buffering structure 120' counts the number of clocks it takes for the memory devices to start returning the data that the memory controller requests to the buffering structure 120'. The number of clocks may be obtained from a BIOS (Basic Input/Output System) or similar devices when the memory system boots. During start up, the BIOS obtains information about the memory devices, from the devices themselves or from an EPROM (Erasable Programmable Read Only Memory) residing on the memory module containing the memory devices. Based on the obtained information, the BIOS determines the delay/latency associated with the memory devices. The BIOS then conveys this information to either the memory controller and/or the embedded logic 195 in the buffering structure 120'.

Figure 5B:
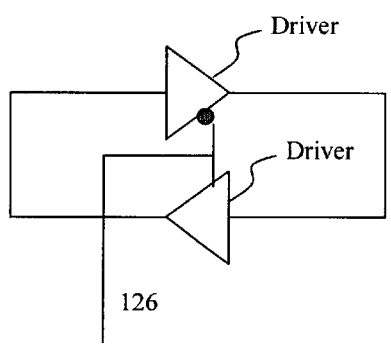
FIG. 5b shows an illustrative example of mechanisms to change the direction of data flow in a buffer.

In one implementation, when the delay period ends, and on the same clock that the memory devices start to drive the data to be read back, the embedded logic 195 causes a control signal 126 to be sent from the ADDR/CMD buffer 122' to the data buffers 123', 124'. This signal controls the data buffers 123', 124' to change their drive direction back toward the memory controller. FIG. 5b shows an illustrative example of a mechanism for the buffering structure 120' to change the direction of data flow therethrough. In this illustrative example, the drive direction is controlled using two drivers configured in the fashion illustrated in FIG. 5b. The drivers may reside in the data buffers 123', 124'. When the drive direction needs to be changed, the ADDR/CMD buffer 122' sends a control signal "high" to the two drivers in the data buffers 123', 124' through a link 126. A control signal "high" turns off the top driver and turns on the bottom driver, allowing the data to be driven toward the memory controller. On the other hand, when a "low" signal is sent to the drivers, the top driver is turned on and the bottom driver is turned off, keeping the drive direction in the default direction.

In another implantation, the ADDR/CMD buffer 122' may also reverse the direction of data flow through itself. Once the direction of data flow through the buffering structure 120' or the data buffers 123', 124' is driven in the opposite direction, the read-data, or any type of data that the memory controller may request from the memory devices, can flow readily from the memory devices to the memory controller. When the read-data is being driven in the opposite direction, the embedded logic 195 controls the data buffers 123', 124' to continue driving the read-data in the direction of the memory controller for the required amount of time it takes to return all the read-data for that read command.

The amount of time for returning all the read-data (hereinafter referred to as the "returning data time") may be determined by various methods. In one implementation, the returning data time is calculated based on a read burst. This has traditionally been a programmable feature of a memory device such as a DRAM. During start up, the BIOS indicates to the DRAM how long a read burst is to last, i.e., how much data is to transferred in a burst. The recent trend is toward a fixed burst length—e.g., eight bytes—because it is easier to implement for a DRAM controller at high operating speed. However, variable and/or programmable burst lengths are also applicable.

Although the above embodiments describe the buffering structure 120' as having a default data flow direction towards the memory devices, another embodiment may have the data buffers 123', 124' default to drive towards the memory controller. Such default direction facilitates a read because the direction of data flow through the data buffers need not to be switched when reading data from the memory devices to the memory controller. In such embodiment, instead of decoding for a read command, the embedded decoder 190 in the CMD/ADDR buffer 122' decodes for a write command. Whenever the embedded decoder 190 sees a write command, the embedded logic 195 implements a delay period for the write command to propagate to the memory devices. After the delay period has passed, the embedded logic 195 sends out a signal causing the data buffers 123', 124' to drive in the opposite direction. The data buffers 123', 124' continue to drive in the direction of the memory devices for the required amount of time it takes to write all the data to be written, or written-data, for that write command.

In another embodiment, the decoder 190 and the embedded logic 195 may be located in the data buffers 123', 124' or elsewhere in the buffering structure 120'. In such embodiment, the command information 116 is routed to the data buffers 123', 124', so that it can be decoded by the decoder 190.

Figure 6:
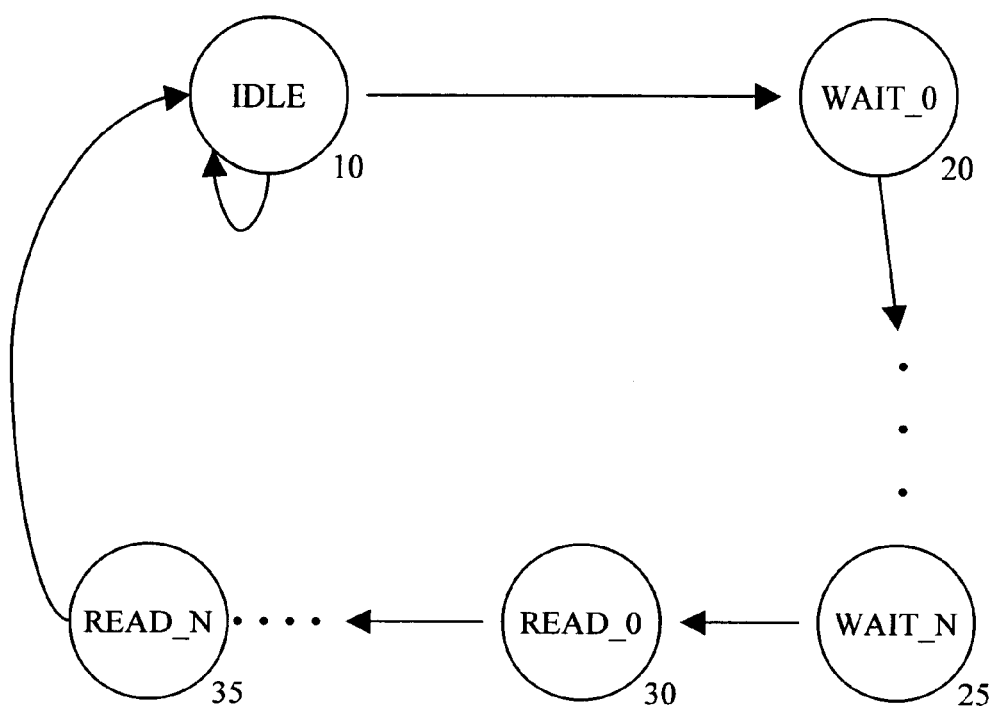
FIG. 6 shows an illustrative example of a state diagram according to an embodiment of the present invention.

FIG. 6 shows an illustrative example of a state diagram according to an embodiment of the present invention. The different states defined by the embedded logic 195 may be represented by a state-machine. The state-machine presumably starts at an "idle" state 10. In this "idle" state 10, the state-machine illustratively defaults in the direction of the memory devices. The direction of data flow through a buffer stays in the direction of the "idle" state 10 until the decoder 190 decodes a command that requires the direction of data flow to be changed. Assuming that the decoder 190 decodes a read command with a chip select signal and communicates the decoded command to the embedded logic 195, the embedded logic 195 causes the state-machine to change from the "idle" state 10 to a "wait_0" state 20. Depending on how long the delay period is for the data to be read, or read-data, to be ready for driving in the opposite direction, the state-machine goes through the different wait states until a "wait_N" state 25 is reached. The number "N" may, for example, represent the number of clocks for the full delay period, and each wait state may represent one clock. At the end of "wait_N" period, the state-machine reverses the direction of data flow through the buffer, in the direction of the memory controller. After the "wait_N" state 25, and after the direction of data flow is changed, the state-machine changes to "read_0" state 30. The state-machine again counts for a certain read period until the "read_N" state 35, allowing all the read-data to be transmitted from the buffer to the memory controller. The number of periods "N" may, for example, represent the number of clocks needed for the memory controller to receive all the read-data.

The implementation of the state-machine may vary from a basic version shown in FIG. 6 to handle multiple memory banks with outstanding reads. It may also be implemented in an opposite fashion, i.e., to default to returning read-data and switch to driving data to the memory devices only when a write command is detected by the decoder 190. In this implementation, when the state-machine sees a write command, it waits either a programmed amount or a fixed amount of time before it starts driving to the memory devices. The programmed amount of time is preferably based on the protocol and capabilities of the memory system. After waiting for some time, the state-machine goes into write states, where it writes data to the memory devices. The length of the time that the state-machine stays in the write states depends on the length of a write burst. Like a read burst, the write burst could be fixed, programmable, and/or variable.

Figure 7:
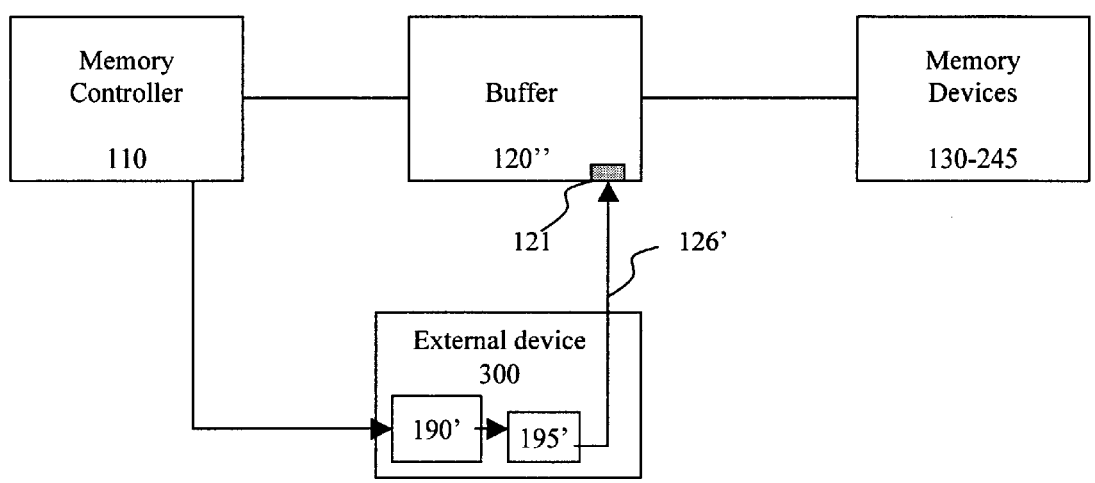
FIG. 7 shows a memory system utilizing an external data flow controlling device according to an embodiment of the present invention.

In another embodiment, instead of having a decoder and logic located in the buffer 120, the decoder and logic are located in an external device. FIG. 7 shows an external device 300 for controlling the direction of data flow through a buffer 120" according to an embodiment of the invention. The external device 300 contains a decoder 190' and logic 195'. The external device 300 is coupled to the memory controller 110 and the buffering structure 120". The memory controller 110 transmits command information to the external device 300, where the command information is decoded by the decoder 190'. The decoded command is fed through the logic 195'. Depending on the default direction the data flow through the buffering structure 120", or just the data buffers therein, and the kind of command, the logic 195' sends a control signal 126' to the buffering structure 120" to change or maintain the direction of data flow. Similarly to the structure shown in FIG. 5b, one implementation of the control signal is an output enable control. The control signal 126' is sent to an output enable pin 121 on the buffering structure 120". Depending on whether the output enable pin is high or low, the direction of data flow is controlled.

Figure 8:
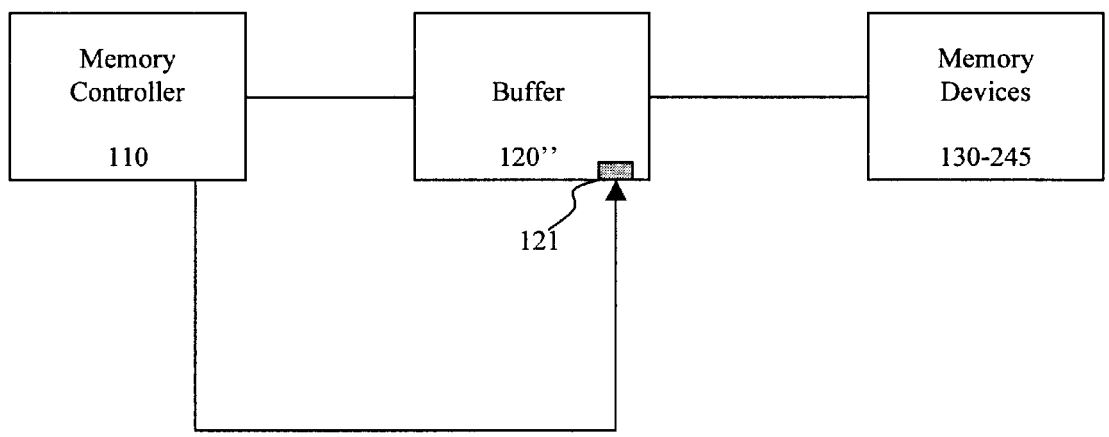
FIG. 8 shows a memory system with a data flow director residing in a memory controller according to an embodiment of the present invention.

In other embodiments, instead of having the buffer itself or an external device controlling the direction of data flow through the buffer, the memory controller 110 and/or the memory devices 130–145 set the direction of data flow through the buffer 120. Depending on the implementation, a signal either originates from the memory controller 110, or the memory devices 130–145, to the buffer 120" indicating the present data flow direction of the buffer 120". FIG. 8 shows a memory system with a data flow director residing in the memory controller 110. In this embodiment, a decoding device (not shown) within the memory controller 110 decodes a command from the memory controller 110. Based on the decoded command, the memory controller 110 then controls the direction of data flow through the buffer 120" by sending out a signal directly to the output enable 121 on the buffer 120". For example, a high signal on the output enable may represent that the direction of data flow is to be changed, while a low signal on the output enable may represent that no change is needed.

Figure 9:
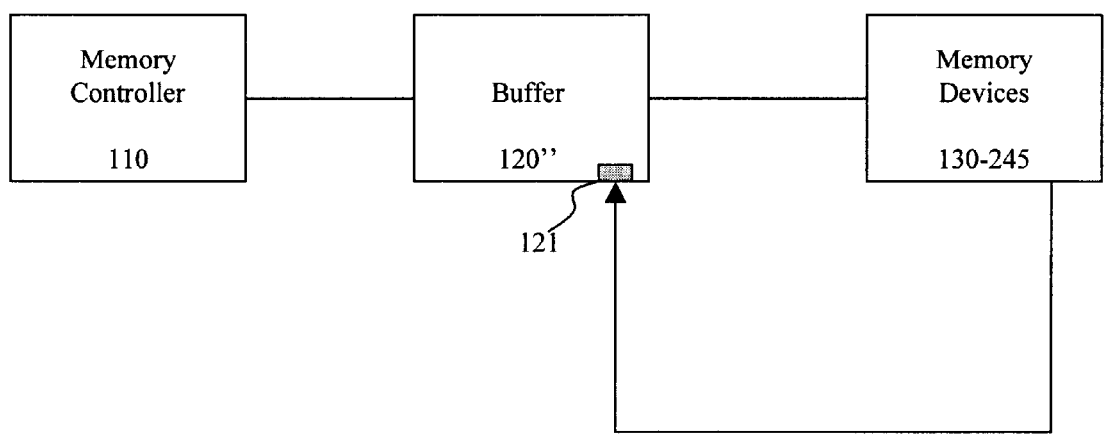
FIG. 9 shows a memory system with a data flow director residing in a memory device according to an embodiment of the present invention.

FIG. 9 shows a memory system with a data flow director residing in the memory devices 130–145. In this embodiment, a decoding device (not shown) within the memory devices 130–145 decodes a command from the memory controller 110. Based on the decoded command, the memory devices 130–145 control the direction of data flow through data buffers in the buffer 120" by sending out a signal directly to the output enable 121 on the buffer 120". For example, a high signal on the output enable may represent that the direction of data flow is to be changed, while a low signal on the output enable may represent that no change is needed.

Figure 10:
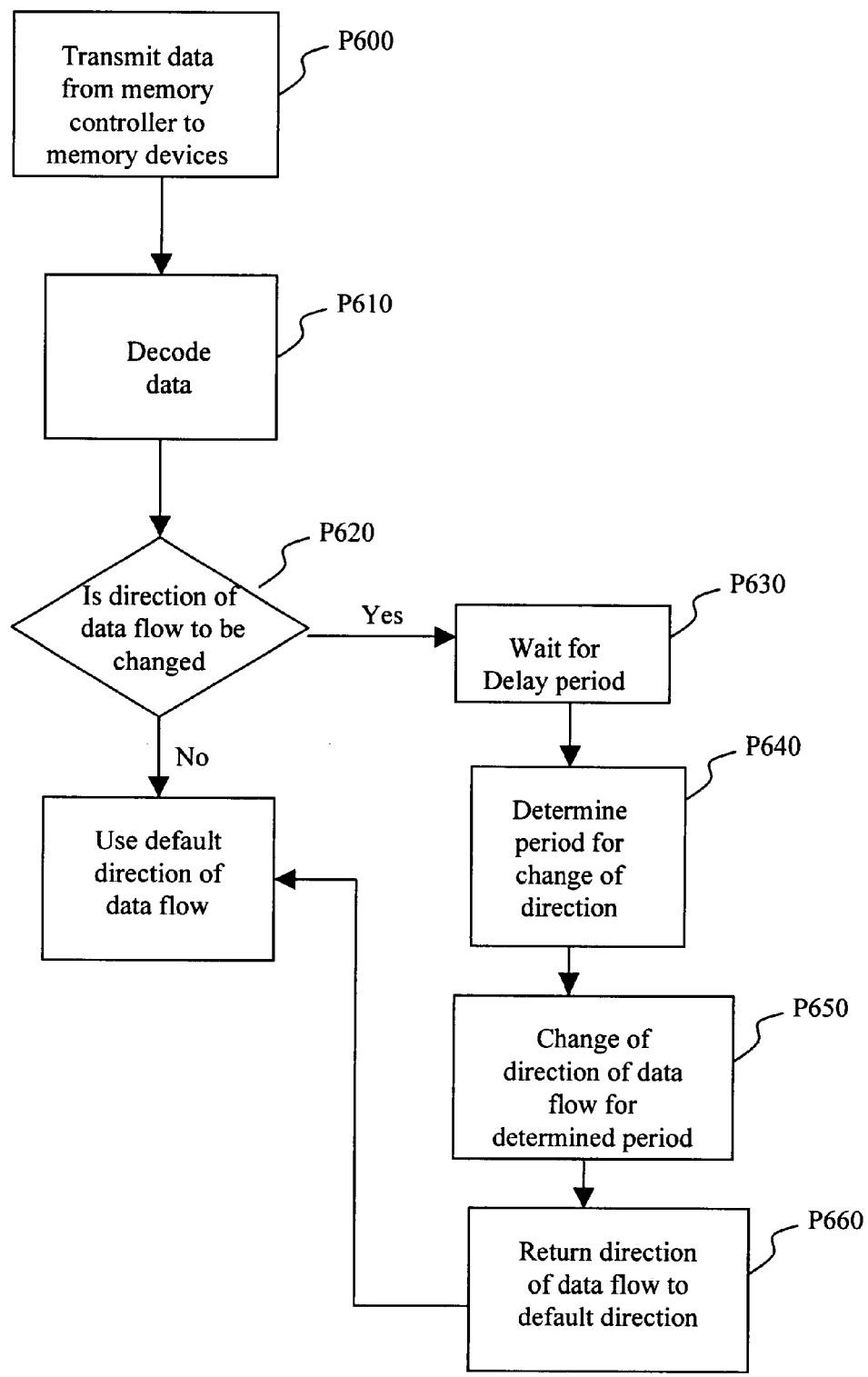
FIG. 10 illustrates processes for operating a memory system according to an embodiment of the present invention.

FIG. 10 illustrates processes for operating a memory system according to an embodiment of the present invention. The memory system includes a memory controller, a buffer, and memory devices. The buffer is adapted to operate in a bi-directional manner for a direction of data flow therethrough. In block P600, data is transmitted from the memory controller to the memory devices via the buffer. The data may, for example, be write-data, address information, and/or command information. In other embodiments, data, such as status information and/or read-data, may be transmitted from the memory devices to the memory controller via the buffer. In block P610, the data is decoded. In block P620, the direction of data flow through the buffer is determined based on the decoded data. When the determined direction differs from a default direction, the direction of data flow through the buffer is changed. In block P630, assuming that the direction of data blow through the buffer is to be changed, a delay period is waited before the direction of data flow is changed. In block P640, a period for changing the direction of data flow through the buffer is determined. In block P650, the direction of data flow is changed for the determined period. In block P660, the direction of data flow is returned to the default direction after the determined period expires.

Embodiments of the invention and method as set forth above provide the ability to inexpensively, reliably and efficiently control the flow of data in a memory interface such as a buffering structure. The embodiments related to a buffer controlling the direction of data flow also provide the additional advantage of saving pins between a memory controller and the buffer or between a memory device and the buffer. While embodiments related to an external device controlling the direction of data flow require additional pins to directly operate the output enables on the buffer, they facilitate the control of data flow through the buffer.

While the description above refers to particular embodiments of the present invention, it will be understood that many modifications may be made without departing from the spirit thereof. For example, instead of using a finite state-machine to implement the embedded logic, the embedded logic could be stored in a Read Only Memory (ROM), or the embedded logic could simply be timers that count clocks. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A memory system, comprising:
    at least one memory device having a plurality of storage cells to store data;
    a memory controller that sends first data to the at least one memory device and receives second data from the at least one memory device;
    a buffer interconnecting for the at least one memory device and the memory controller, the buffer operating in a bi-directional manner for direction of data flow therethrough; and a data flow director to control the direction of data flow through the buffer based on the first or second data transmitted from the memory controller or the at least one memory device, wherein the first data is selected from a group of address information, data to be written to the at least one memory device, status information, and command information.

2. The memory system of claim 1, wherein the buffer has the functionality to either receive the first data from the memory controller and transmit said first data to the at least one memory device, or receive the second data from the at least one memory device and transmit said second data to the memory controller.

3. The memory system of claim 1, wherein the data flow director resides in the buffer, the data flow director further comprising an embedded decoder to decode the first data received from the memory controller and embedded logic to determine, based on the decoded first data, whether and when to change the direction of the data flow through the buffer.

4. The memory system of claim 1, wherein the data flow director resides in an external data flow controlling device, the data flow director including an embedded decoder to decode the first data received from the memory controller and embedded logic to determine, based on the decoded first data, whether and when to change the direction of the data flow through the buffer.

5. The memory system of claim 1, wherein the data flow director decodes the first data to be sent from the memory controller to the buffer and controls, based on the decoded first data, the direction of the data flow through the buffer utilizing an output enable control signal.

6. The memory system of claim 1, wherein the at least one memory device and the buffer are housed within a memory module.

7. The memory system of claim 1, wherein the buffer resides on a motherboard of a computer system and the at least one memory device is housed within a memory module.

8. A memory system, comprising:
at least one memory device to store data;
a memory controller that sends first data to the at least one memory device and receives second data from the at least one memory device;
a buffer interconnecting for the at least one memory device and the memory controller, the buffer operating in a bi-directional manner for direction of data flow therethrough, wherein the buffer includes at least one data buffer that buffers at least one of the first and second data and an address and command buffer that buffers address information and command information; and
a data flow director to control the direction of data flow through the buffer based on the first or second data transmitted from the memory controller or the at least one memory device.

9. A memory system, comprising:
at least one memory device to store data;
a memory controller that sends first data to the at least one memory device and receives second data from the at least one memory device;
a buffer interconnecting for the at least one memory device and the memory controller, the buffer operating in a bi-directional manner for direction of data flow therethrough; and
a data flow director to control the direction of data flow through the buffer based on the first or second data transmitted from the memory controller or the at least one memory device, wherein the data flow director resides in the buffer, the data flow director further comprising an embedded decoder to decode the first data received from the memory controller and embedded logic to determine, based on the decoded first data, whether and when to change the direction of the data flow through the buffer, and wherein a default direction for the direction of data flow through the buffer is set in the direction from the memory controller to the at least one memory device, and when the decoder detects a request for a read, the embedded logic enters a mode where a prescribed amount of time is elapsed while the direction of the data flow through the buffer is changed to allow read data to be returned to the memory controller.

10. The memory system of claim 9, wherein the embedded logic is a finite state machine.

11. The memory system of claim 9, wherein the embedded logic includes a read only memory.

12. A memory system, comprising:
at least one memory device to store data;
a memory controller that sends first data to the at least one memory device and receives second data from the at least one memory device;
a buffer interconnecting for the at least one memory device and the memory controller, the buffer operating in a bi-directional manner for direction of data flow therethrough; and
a data flow director to control the direction of data flow through the buffer based on the first or second data transmitted from the memory controller or the at least one memory device, wherein the data flow director resides in the buffer, the data flow director further comprising an embedded decoder to decode the first data received from the memory controller and embedded logic to determine, based on the decoded first data, whether and when to change the direction of the data flow through the buffer, and wherein a default direction for the direction of data flow through the buffer is set in the direction from the at least one memory device to the memory controller, and when the decoder detects a request for a write, the embedded logic enters a mode where a prescribed amount of time is elapsed while the direction of the data flow through the buffer is changed to allow the data to be sent to the at least one memory device for storage.

13. A memory system, comprising:
at least one memory device having a plurality of storage cells to store data;
a memory controller that sends first data to the at least one memory device and receives second data from the at least one memory device;
a buffer interconnecting for the at least one memory device and the memory controller, the buffer operating in a bi-directional manner for direction of data flow therethrough; and
a data flow director to control the direction of data flow through the buffer based on the first or second data transmitted from the memory controller or the at least one memory device, wherein the data flow director resides in the memory controller.

14. A memory system, comprising:
at least one memory device to store data;
a memory controller that sends first data to the at least one memory device and receives second data from the at least one memory device;

a buffer interconnecting for the at least one memory device and the memory controller, the buffer operating in a bi-directional manner for direction of data flow therethrough; and a data flow director to control the direction of data flow through the buffer based on the first or second data transmitted from the memory controller or the at least one memory device, wherein the data flow director resides in the memory device.

15. The memory system of claim 14, wherein the data flow director decodes the second data received from the buffer, and controls, based on the decoded second data, the direction of the data flow through the buffer utilizing an output enable control signal.

16. A buffering device interconnecting a memory controller and a memory device, comprising:

at least one buffer to receive data from the memory controller or the memory device, wherein the at least one buffer includes an address and command buffer and a data buffer, the direction of data flow through the data buffer being controlled by the address and command buffer, wherein the address and command buffer includes an embedded decoder to decode data received from the memory controller or the memory device and embedded logic to determine, based on the decoded data, whether and when to change a direction of data flow through the data buffer, and wherein the at least one buffer is adapted to operate in a bi-directional manner for the direction of data flow therethrough, receiving data from the memory controller and transmitting said data to the memory device, as well as receiving data from the memory device and transmitting said data to the memory controller.

17. The buffering device of claim 16, wherein the data to be received and transmitted is selected from the group of data to be written to the memory device, data to be read from the memory device, address information, and command information.

18. A buffering device interconnecting a memory controller and a memory device, comprising:

at least one buffer to receive data from the memory controller or the memory device;

an embedded decoder to decode data received from the memory controller or the memory device; and embedded logic to determine, based on the decoded data, whether and when to change a direction of data flow through the buffer, wherein the buffer is adapted to operate in a bi-directional manner for the direction of data flow therethrough, receiving data from the memory controller and transmitting said data to the at least one memory device, as well as receiving data from the at least one memory device and transmitting said data to the memory controller, wherein a default direction for the direction of data flow through the buffer is set from the memory controller to the memory device, and when the decoder detects a request for a read, the embedded logic enters a mode where a prescribed amount of time is elapsed while direction of the data flow through the buffer is changed to allow read data to be returned to the memory controller.

19. A buffering device interconnecting a memory controller and a memory device, comprising:

at least one buffer to receive data from the memory controller or the memory device;

an embedded decoder to decode data received from the memory controller or the memory device; and embedded logic to determine, based on the decoded data, whether and when to change a direction of data flow through the buffer, wherein the buffer is adapted to operate in a bi-directional manner for the direction of data flow therethrough, receiving data from the memory controller and transmitting said data to the at least one memory device, as well as receiving data from the at least one memory device and transmitting said data to the memory controller, wherein a default direction for the direction of data flow through the buffer is set from the memory device to the memory controller, and when the decoder detects a request for a write, the embedded logic enters a mode where a prescribed amount of time is elapsed while the direction of the data flow through the buffer is changed to allow the data to be sent to the memory device for storage.

20. A method of operating a memory system including a memory controller, a memory device, and a buffer, the method comprising:

transmitting data from the memory controller to the memory device via the buffer, or from the memory device to the memory controller via the buffer, the buffer being adapted to operate in a bi-directional manner for a direction of data flow therethrough;

decoding the data;

determining the direction of data flow through the buffer based on the decoded data; and changing the direction of data flow through the buffer to the determined direction when the determined direction differs from a default direction.

21. The method of claim 20 further comprising waiting for a delay period before changing the direction of data flow through the buffer to the determined direction when the determined direction differs from a default direction.

22. The method of claim 20 further comprising:

determining a period for changing the direction of data flow through the buffer when the determined direction differs from the default direction;

changing the direction of data flow for said period; and returning the direction of data flow back to the default direction after the period.

23. The method of claim 20, wherein the default direction for the direction of data flow through the buffer is set from the memory controller to the memory device, and when a request for a read is decoded, a prescribed amount of time is elapsed while the direction of the data flow through the buffer is changed to allow read data to be returned to the memory controller.

24. The method of claim 20, wherein a default direction for the direction of data flow through the buffer is set from the memory device to the memory controller, and when a request for a write is detected, a prescribed amount of time is elapsed while the direction of the data flow through the buffer is changed to allow the data to be sent to the memory device for storage.

25. The method of claim 20, wherein the data transmitted is selected from the group of data to be written to the at least one memory device, data to be read from the at least one memory device, address information and command information.

* * * * *